(12) United States Patent
De Samber et al.

(10) Patent No.: US 12,538,405 B2
(45) Date of Patent: Jan. 27, 2026

(54) LIGHTING CONTROLLER AND A LIGHTING ARRANGEMENT FOR MITIGATING STRESS IN ANIMALS

(71) Applicant: SIGNIFY HOLDING B.V., Eindhoven (NL)

(72) Inventors: Marc Andre De Samber, Lommel (BE); Aaron Benjamin Stephan, Chanhassen, MN (US); Curtis Allen Leyk, Albany, MN (US); Harry Broers, 'S-Hertogenbosch (NL); Dragan Sekulovski, Eindhoven (NL); Maurice Alexander Hugo Donners, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 44 days.

(21) Appl. No.: 18/716,557

(22) PCT Filed: Dec. 8, 2022

(86) PCT No.: PCT/EP2022/085015
§ 371 (c)(1),
(2) Date: Jun. 5, 2024

(87) PCT Pub. No.: WO2023/110630
PCT Pub. Date: Jun. 22, 2023

(65) Prior Publication Data
US 2025/0040016 A1 Jan. 30, 2025

Related U.S. Application Data

(60) Provisional application No. 63/289,836, filed on Dec. 15, 2021.

(30) Foreign Application Priority Data

Jan. 3, 2022 (EP) .................................... 22150074

(51) Int. Cl.
*H05B 47/115* (2020.01)
*A01K 13/00* (2006.01)
(Continued)

(52) U.S. Cl.
CPC ......... *H05B 47/115* (2020.01); *H05B 47/155* (2020.01); *A01K 13/00* (2013.01); *H05B 47/165* (2020.01); *H05B 47/1985* (2024.01)

(58) Field of Classification Search
None
See application file for complete search history.

(56) References Cited

U.S. PATENT DOCUMENTS 9,807,983 B2 * 11/2017 Yuki ..................... G06V 10/75
2015/0271885 A1 9/2015 Eakins et al.

FOREIGN PATENT DOCUMENTS

| CN | 108391356 B | 7/2020 |
| RU | 2450511 C1 | 5/2012 |
| WO | 2021023715 A1 | 2/2021 |

* cited by examiner

*Primary Examiner* — Kenneth B Wells

(57) ABSTRACT

The invention provides a lighting system controller for mitigating stress of at least one animal intended to move from a first space to a second space, wherein said stress is caused by a perceived difference, as perceived by the at least one animal, between the first space and the second space; wherein the lighting system controller is configured to: obtain a first input indicative of an environmental characteristic of the first space; obtain a second input indicative of an environmental characteristic of the second space; determine a difference feature between the environmental characteristic of the first space and the environmental characteristic of the second space; determine a first light setting for illuminating the first space and/or a second light setting for illuminating the second space based on said difference feature to reduce said perceived difference between the (Continued)

environmental characteristic of the first space and the environmental characteristic of the second space; control at least one first light source to illuminate the first space according to the determined first light setting during a first time period, and/or control at least one second light source to illuminate the second space according to the determined second light setting during a second time period; wherein the environmental characteristic is a geometric dimension of a respective space, AND/OR wherein the environmental characteristic is a dynamic state of a respective space.

13 Claims, 4 Drawing Sheets

(51) Int. Cl.
    *H05B 47/155*    (2020.01)
    *H05B 47/165*    (2020.01)
    *H05B 47/175*    (2020.01)

LIGHTING CONTROLLER AND A LIGHTING ARRANGEMENT FOR MITIGATING STRESS IN ANIMALS

CROSS-REFERENCE TO PRIOR APPLICATIONS

This application is the U.S. National Phase application under 35 U.S.C. § 371 of International Application No. PCT/EP2022/085015, filed on Dec. 8, 2022, which claims the benefit of U.S. Provisional Patent Application No. 63/289,836, filed on Dec. 15, 2021 and European Patent Application No. 22150074.7, filed on Jan. 3, 2022. These applications are hereby incorporated by reference herein.

FIELD OF THE INVENTION

The invention relates to a lighting system controller for mitigating stress of at least one animal intended to move from a first space to a second space, wherein said stress is caused by a perceived difference, as perceived by the at least one animal, between the first space and the second space. The invention further relates to a lighting arrangement comprising said lighting system controller and a lighting system. The invention further relates to a corresponding method, and computer program product.

BACKGROUND OF THE INVENTION

Animal farming is characterized by raising animals during a lifecycle. Such animals are known to experience multiple disruptions in their lifecycle. Such disruptions may be related to the relocation of animals to a new location. For example, livestock animals may be relocated to (for them) an unknown new location within the stable. For example, the animals may also suddenly be forced through connecting pathways such as a corridor, or transported with transportation means such as a truck. The animals may moreover be transitioned to a temporary residence, such as a holding pen in the slaughterhouse just before slaughter.

Animal welfare is a relevant parameter in animal farming. Even though said disruptions may be planned by the farmer during the lifecycle of the animal, the animal itself will experience such disruptions as sudden and unexpected. Disruptions may thereby create a new, an out-of-control and/or an unknown situation to the animal. These disruptions, in particular said relocations, may therefore lead to stress of an animal. Stress may subsequently impact productivity because of growth stagnation, may increase mortality due to panic and crowding, may change animal-to-animal behaviour such as increasing aggression, or may reduce meat quality due to stress hormones affecting the pH value of the meat.

A well-known practice to reduce stress in piglets, when removed from their mother sow and relocated to a fattening pen (i.e. the disruption), is to hang a cloth in the fattening pen that carries the smell of the mother sow. This reduces stress, because the piglets feel more familiar with the fattening pen upon arrival, even though the fattening pen is a completely new environment and not their accustomed location.

However, such practices in animal farming may be cumbersome in modern animal farming, in which less manual labor and more automation is envisioned to ensure more efficiency in productivity while preserving animal welfare. Hence, a clear need exists to improve animal welfare in animal farming, by reducing stress in animals caused by disruptions in their lifecycle, especially disruptions related to relocation.

CN108391356B discloses a smart home lighting control system wherein the light intensity between two different rooms is equalized for the comfort of humans.

SUMMARY OF THE INVENTION

It is an object of the invention to reduce stress in animals by making disruptions in their lifecycle perceived as less impactful with the use of illumination. The present invention in particular addresses disruptions caused by relocating at least one animal from a first space, to which the at least one animal is accustomed, to a different second space. Thereby, the invention leverages the insight that illumination may be used to optically reduce the perceived difference, as perceived by the at least one animal, between the first space and second space.

For example, to mitigate the stress caused by moving the at least one animal from a larger first space to a smaller second space, said second space may be illuminated according to a determined second light setting such that the second space appears larger to the at least one animal. For example, a horizontal line pattern may be projected in the second space, to cause said second space to be perceived as optically larger.

On the other hand, for example, to mitigate the stress caused by moving the at least one animal from a first space to a second space, wherein the second space has a smaller width relative to the first space, the at least one animal may be pre-conditioned in the broader-width first space to the upcoming smaller-width second space by illuminating the first space according to a determined first light setting. For example, a vertical line pattern may be projected in the first space before moving the at least one animal to the second space, to cause said first space (to which the animals are accustomed to) to be perceived as optically smaller in width and thereby less different to the smaller-width second space (to which the animals will be moved towards).

For example, to mitigate the stress caused by relocating the at least one animal from a static first space to a moving second space (i.e. e.g. the cargo space of a transport vehicle), the at least one animal may be pre-conditioned in the static first space to the upcoming moving second space by illuminating the first space according to a determined first light setting. For example, a dynamic light pattern moving in the horizontal direction may be projected in the first space before relocating the at least one animal, to cause said first space (to which the animals are accustomed to) to be perceived as optically moving and thereby less different from the moving second space.

Hence, it is an object of the invention to provide an improved lighting system controller, which at least alleviates the problems and disadvantages mentioned above. Therefore, the invention provides a lighting system controller for mitigating stress of at least one animal intended to move from a first space to a second space, wherein said stress is caused by a perceived difference, as perceived by the at least one animal, between the first space and the second space; wherein the lighting system controller is configured to: obtain a first input indicative of an environmental characteristic of the first space; obtain a second input indicative of an environmental characteristic of the second space; determine a difference feature between the environmental characteristic of the first space and the environmental characteristic of the second space; determine a first light setting for illuminating the first space and/or a second light setting for illuminating the second space based on said difference feature, wherein the first light setting and/or said second light setting is configured to reduce said perceived difference between the environmental characteristic of the first space and the environmental characteristic of the second space; control at least one first light source to illuminate the first space according to the determined first light setting during a first time period, and/or control at least one second light source to illuminate the second space according to the determined second light setting during a second time period; wherein the environmental characteristic is a geometric dimension of a respective space, and/or wherein the environmental characteristic is a dynamic state of a respective space.

Hence, as partly mentioned, the present invention addresses an intended move of at least one animal from a first space to a second space. Said move may for example be sudden for the at least one animal. Said move may cause stress of the at least one animal, since the environmental characteristic of the second space may be different from an environmental characteristic of the first space, and because the at least one animal may perceive this difference. For example, a pig will experience stress when moved from its pen to a narrow corridor, which may be a pathway to another pen or location. Said move may be phrased as a disruption or disruptive event. Said stress may be phrased as the experience of a stressful event. Said move may moreover be planned or scheduled, for example by a farmer of the at least one animal. Hence, because it is known, a lighting system can be controlled beforehand so as to provide stress relief.

The lighting system controller according to the invention mitigates the stress of the at least one animal intended to move from said first space to said second space. Namely, the lighting system controller determines a difference feature between the environmental characteristic of the first space and the environmental characteristic of the second space. The lighting system controller may thereby compare the first environmental characteristic to the second environmental characteristic and determine said difference feature based on said comparison.

For example, the environmental characteristic may be a geometric dimension, such as a width. The lighting system controller may therefore obtain the width of a first space (e.g. a pen holding an animal) and a width of a second space (e.g. a corridor) to which the animal is intended to move. The difference feature then constitutes the difference in width between the width of the first space and the corresponding width of the second space (e.g. the difference in width of said pen and the corresponding width of said corridor).

The difference feature may for example comprise a relative difference that the width of the second space is smaller than the width of the first space, or a relative difference that the width of the second space is a factor smaller than the width of the first space. For example, the width of the corridor is smaller than the corresponding width of the pen. Moreover, the difference feature may also constitute an absolute difference in that the width of the second space is a value smaller than the width of the first space.

Based on this difference feature, the lighting system controller then determines a first light setting and/or a second light setting, in order to control respectively at least one first light source during a first time period and/or at least one second light source during a second time period.

Thereby, the at least one first light source illuminates the first space, and the at least one second light source illuminates the second space.

Because the determined first light setting and/or the determined second light setting is configured to reduce the perceived difference, as perceived by the at least one animal, between the environmental characteristic of the first space and the environmental characteristic of the second space, the illumination of the first space and/or the illumination of the second space would result in the at least one animal experiencing less stress, as the perceived difference between the first space and the second space (and their respective environmental characteristics) is less.

All in all, animal welfare is improved, as the at least one animal experiences less stress, due to the lighting system controller controlling the illumination in the first space and/or the second space based on the determined difference feature and reduces the perceived differences between the first space and the second space.

Said lighting system controller may thus be configured to control, in operation, a lighting system. The lighting system may comprise said at least one first light source and/or said at least one second light source. Said light sources may be luminaires.

Said first space may be adjacent to said second space. Alternatively, said first space may be separated from said second space. For example, said first space may be separated from said second space with a third space in between. Hence, the first space may be connected to the second space via a third space.

Said first space may comprise at least one surface. Said second space may comprise at least one surface. The surface may then for example be a wall, a floor, and/or a ceiling. Said first space and/or said second space may be cubic. Said first space and/or said second space may be cylindrical or a box.

Said first space comprises an environmental characteristic. Said second space also comprises an environmental characteristic. Throughout the application, when determining a difference feature between the environmental characteristic of the first space and the environmental characteristic of the second space, said environmental characteristic is of the same type or category, such that a comparison can be made, and an associated difference can be taken. For example, the environmental characteristic may either be a geometric dimension, a dynamic state, or physical state of the respective space.

Since the first space and the second space may comprise multiple environmental characteristics, each of a different type or category, only the environmental characteristics of the same type or category may be considered when determining the difference feature. Hence, this also renders that, in certain examples, multiple difference features may be determined between the first space and the second space, each for the different type or category.

In alternative phrasing, said first light setting may be configured to control the at least one first light source to render a first lighting characteristic. Said second light setting may be configured to control the at least one second light source to render a second lighting characteristic. Said first lighting characteristic and/or said second lighting characteristic may comprise at least one of: a light intensity, a light color, a light color temperature, a light scene, a light pattern, a light recipe, a light polarization, and a light diffusivity. A light recipe may for example be defined as a dynamic lighting setting with sequential changes of intensity and/or spectrum, and/or of time periods (periodicity) thereof. A light scene may define a temporarily, dynamically and/or time-varying light effect. A light scene may e.g. mimic outdoor light conditions, or natural light conditions.

Said first time period may at least be prior to the move of the at least one animal from the first space to the second space. Said second time period may at least be after the move of the at least one animal from the first space to the second space. In examples, said first time period is prior to the move of the at least one animal from the first space to the second space, and/or said second time period is after the move of the at least one animal from the first space to the second space.

In an embodiment, the lighting system controller may obtain an input indicative of a time of said intended move of the at least one animal, wherein the lighting system controller is configured to determine said first time period and/or said second time period based on said input indicative of the time of said intended move of the at least one animal. Said input may for example be a schedule. Said lighting system controller may receive or retrieve said schedule. Said input may for example be a user input. Said user input may for example be from a user interface device, or user control device.

Said input of a time of said intended move may alternatively be received or retrieved from a sensor device. The sensor device may e.g. comprise a first sensor being part of said at least one first light source and a second sensor being part of said at least one second light source. The sensor may then e.g. be a presence sensor for sensing the presence of the at least one animal in said respective space, so as to indicate the time of the move currently being in progress.

Said input indicative of a time of said intended move may alternatively be obtained from data indicative of the growth process of the at least one animal. This data may for example be the growth curve of the at least one animal. Said growth curve may indicate when a certain threshold is reached, which threshold defines the intended move. For example, when the at least one animal will exceed a weight threshold according to its growth curve at a certain future moment in time, said certain future moment in time may be used to define said input indicative of a time of said intended move, because the at least one animal may be evacuated (in other words relocated to slaughterhouse) at said future moment in time.

The at least one animal may refer to livestock, such as for example cattle or poultry. The at least one animal may similarly for example refer to domestic animals. The at least one animal may for example be at least one pig, at least one swine, at least one horse, at least one cow, at least one sheep, at least one goat, at least one bird, at least one chicken, at least one turkey, at least one rabbit, at least one dog, at least one cat, at least one monkey, at least one camel or dromedary, at least one bear, at least one tiger, at least one fish, at least one arthropod, at least one shrimp, at least one insect, or at least one crustacea.

The first space and/or the second space may for example refer to a room, a chamber, a stable, a farm, a container, a cargo space, a pen, a corridor, a funnel, a box, a conveyor belt, a vehicle, a pit, a housing, or a basin.

In an embodiment, the environmental characteristic may be a geometric dimension of a respective space; wherein the geometric dimension of the second space may be smaller than the corresponding geometric dimension of the first space; wherein illuminating the first space according to the determined first light setting and/or the second space according to the determined second light setting causes a reduced perceived difference between the geometric dimension of the first space and the geometric dimension of the second space. In a related embodiment, the geometric dimension may be a length or a width of the respective space.

In embodiments, the geometric dimensions may also be a height of the respective space. In embodiments, the geometric dimension may also be a volume, a surface area, a layout, a slope, a shape, a relief, or a configuration of the respective space.

As mentioned, the invention leverages the insight that illumination may be used to optically reduce the perceived difference, as perceived by the at least one animal, between the first space and second space.

For example, the projection of a horizontal line pattern onto at least one surface delimiting a respective space, may optically render the perception that said space is more spacious. Namely, the space is then perceived to have an increased length or width. Similarly, the projection of a vertical line pattern onto at least one surface delimiting a respective space, or rendering colored light onto a subset of surfaces of a set of surfaces delimiting the respective space, may render the perception that said space is less spacious in length and/or width, or even 'cozier'. Such techniques may commonly be known in interior design and architecture, but typically with paint or paneling.

Similarly, the present invention leverages the insight that animals may experience a brighter room as more spacious, not only when the central parts of the room are illuminated at a certain light intensity, but also when peripheral regions of said room are illuminated at a higher intensity. Similarly, dark areas in a room do not contribute to the perception of spaciousness of said room. Namely, for a room having two sections, illuminating only one section of a room (e.g. at a threshold light intensity) and keeping the other section completely dark may render the perception of a smaller room compared to illuminating both sections of the room (e.g. at said threshold intensity).

Hence, in an embodiment, related to the embodiment wherein the geometric dimension of the second space may be smaller than the corresponding geometric dimension of the first space, the second light setting may comprise at least one of: (i) a projection of at least one horizontal line pattern, (ii) an increase of light intensity of unlit parts of the second space, and (iii) an increase of light intensity at peripheral regions of the second space, wherein illuminating the second space according to the determined second light setting renders a perception of a larger length and/or larger width of the second space and causes a reduced perceived difference between the geometric dimension of the first space and the geometric dimension of the second space. Thereby, in said embodiment, the second time period may for example be after the move of the at least one animal from the first space to the second space.

Such embodiments are advantageous, as the illuminating of the second space with said determined second light setting reduces the perceived difference between the respective geometric dimension (i.e. length of width) of the first space and the second space, thereby mitigating (or reducing) the stress of the least one animal, that would be caused when moving the animal from the first space (to which the animal is accustomed to) to the (new and different) second space.

In alternative embodiments, the lighting system controller may be configured to determine a third light setting for illuminating the second space; and control the at least one second light source according to the third light setting during a third moment in time, wherein said third moment in time is after the second moment in time. The third light setting may comprise an optimal light scene or recipe for the current status of the at least one animal. Hence, as the present invention mitigates the stress of the at least one animal when moved from the first space to the second space, the illumination according to the third light setting during the third moment in time ensures that the at least one animal continues to feel comfortable within the second space after the stress mitigating illumination is provided.

Additionally or alternatively, in an embodiment, related to the embodiment wherein the geometric dimension of the second space may be smaller than the corresponding geometric dimension of the first space, the second space may comprise a set of surfaces delimiting the second space, wherein the second light setting may comprise illuminating a first subset of surfaces of the set of surfaces delimiting the second space with a first color light and/or illuminating a second subset of surfaces of the set of surfaces delimiting the second space with a second color light; wherein said first color light is different from said second color light; wherein illuminating the second space according to the determined second light setting renders a perception of a larger length and/or larger width of the second space and causes a reduced perceived difference between the geometric dimension of the first space and the geometric dimension of the second space.

In embodiments, said first subset of surfaces of the set of surfaces delimiting the second space comprises a ceiling surface of the second space and one adjacent vertical surface of the second space (e.g. a wall). In embodiments, said first color light may be darker than the second color light.

In embodiments, said first subset of surfaces of the set of surfaces delimiting the second space comprises vertical surfaces of the second space, such as for example walls, wherein said second subset of surfaces of the set of surfaces delimiting the second space comprises horizontal surfaces of the second space, such as for example a floor and a ceiling.

The first space may also be illuminated accordingly during a first time period, so as to optically reduce the perceived difference, as perceived by the at least one animal, between the first space and second space. Such illumination may be configured to mitigate the stress of the at least one animal by pre-conditioning the at least one animal in the first space to the environmental characteristic of the second space.

In other words, the at least one animal in a first space may be prepared during a first time period for an intended move to a different second space. Said preparing may comprise getting the at least one animal accustomed to the different environmental characteristic of the second space with the use of illumination.

In an embodiment, related to the embodiment wherein the geometric dimension of the second space may be smaller than the corresponding geometric dimension of the first space, the lighting system controller may be arranged for mitigating said stress by pre-conditioning the at least one animal in the first space to the environmental characteristic of the second space; wherein the first time period is prior to the move of the at least one animal from the first space to the second space; wherein the first light setting may comprise at least one of: (i) a projection of at least one vertical line pattern, (ii) a decrease of light intensity of lit parts of the first space, (iii) a decrease in light intensity at peripheral regions of the first space, (iv) an increase in light intensity in non-peripheral regions of the first space, (v) a projection of a gradually narrowing concentric circles during the first time period, and (vi) a projection of a gradually narrowing trellis pattern during the first time period; wherein illuminating the first space according to the determined first light setting renders a perception of a smaller length and/or smaller width of the first space and causes a reduced perceived difference between the geometric dimension of the first space and the geometric dimension of the second space.

Such an embodiment is advantageous, as the mentioned examples for the first light setting all contribute to render a perception of a smaller length or width of the first space, and thereby pre-conditioning the at least one animal for the intended move to the second space having said smaller length or width, and thereby mitigating (or: reducing) the stress of the at least one animal. Similar examples may be envisioned to render a perception of a smaller height of the first space.

Additionally or alternatively, in an embodiment, related to the embodiment wherein the geometric dimension of the second space may be smaller than the corresponding geometric dimension of the first space, the first space may comprise a set of surfaces delimiting the first space, wherein the first light setting may comprise illuminating a first subset of surfaces of the set of surfaces delimiting the first space with a first color light and/or illuminating a second subset of surfaces of the set of surfaces delimiting the first space with a second color light; wherein said first color light is different from said second color light; wherein illuminating the first space according to the determined first light setting renders a perception of a smaller length, smaller width, and/or smaller height of the first space and causes a reduced perceived difference between the geometric dimension of the first space and the geometric dimension of the second space.

In aspects, the first light setting may be determined such as to cast shadow regions within the first space, so as to influence the perception of the at least one animal of the first space.

In embodiments, said first subset of surfaces of the set of surfaces delimiting the second space comprises a first vertical surface of the second space and a second vertical surface of the second space, wherein said first vertical surface is opposite to said second vertical surface, wherein said second subset of surfaces of the set of surfaces delimiting the second space comprises at least a ceiling surface and other vertical surfaces of said set of surfaces delimiting the second space, wherein said first color light may be darker than the second color light; wherein illuminating the first space according to the determined first light setting renders a perception of a smaller length or width of the first space and causes a reduced perceived difference between the geometric dimension of the first space and the geometric dimension of the second space. Said vertical surfaces may e.g. be walls.

In embodiments, said first subset of surfaces of the set of surfaces delimiting the first space comprises a vertical surface, such as for example a wall, of the second space; wherein illuminating the first space according to the determined first light setting renders a perception of a smaller length and causes a reduced perceived difference between the geometric dimension of the first space and the geometric dimension of the second space. Such an embodiment is advantageous, as highlighting one wall in the first space with a first light color, said first space may be perceived as shortened, and thereby having a smaller length.

In some examples, the difference feature between said first space and said second space may comprise a height of the second space being smaller than a corresponding height of the first space. In embodiments related thereto, and to the above: said first subset of surfaces of the set of surfaces delimiting the first space comprises a ceiling surface of the second space, and said second subset of surfaces of the set of surfaces delimiting the first space comprises vertical surfaces of the second space, such as for example walls of the second space; wherein said first color light may be darker than the second color light; wherein illuminating the first space according to the determined first light setting renders a perception of a smaller height of the first space and causes a reduced perceived difference between the geometric dimension of the first space and the geometric dimension of the second space.

In an embodiment, related to the embodiment wherein the geometric dimension of the second space may be smaller than the corresponding geometric dimension of the first space, the first light setting may comprise a projection of a first grid pattern in the first space, wherein the second light setting comprises a projection of a second grid pattern in the second space, wherein a grid size of the second grid pattern is larger than a grid size of the first grid pattern.

In an embodiment, the first space may be an animal enclosure; wherein the second space may be a corridor; wherein the geometric dimension may be a width of the respective space; and wherein the width of the corridor is smaller than the width of the animal enclosure.

As partly mentioned, the environmental characteristic may also be a physical state or dynamic state of a respective space. Said dynamic state may be a species of the physical state. The dynamic state, as defined within this application, may relate to a respective space being stationary (or static) or being in motion. Thereby, being in motion may refer to being in motion at least partly during the second time period. For example, a cargo space of an animal transport vehicle may be considered in motion, even though the vehicle may stop occasionally for traffic lights.

In an embodiment, the environmental characteristic may be a dynamic state of a respective space; wherein the first space is stationary, wherein the second space is in motion; wherein illuminating the first space according to the determined first light setting and/or the second space according to the determined second light setting causes a reduced perceived difference between the first space being stationary and the second space being in motion. In a related embodiment, the first light setting may comprise a dynamic light scene for illuminating the first space.

In an embodiment, said dynamic light scene may comprise a light pattern moving in a horizontal direction relative to gravity. Said horizontal direction relative to gravity may also be phrased as in a direction substantially perpendicular to gravity. Such an embodiment is advantageous, as a light pattern moving in horizontal direction relative to gravity may induce the perception of motion to the at least one animal, even though the at least one animal may be within a stationary first space. Hence, the animals may advantageously be pre-conditioned for the intended move to the second space, which is a second space in motion. This mitigates (or reduces) the stress of the at least one animal, because the at least one animal could already get accustomed to the motion by inducing the perception of motion with illumination.

Similarly, in an embodiment, said dynamic light scene may comprise a light scene mimicking the dynamics of outdoor conditions. Thereby, the second space may be in motion through an outdoor domain. In further examples, said outdoor conditions may be outdoor natural conditions, or outdoor artificial conditions. Said outdoor natural conditions may for example be shades or moonlight. Said outdoor artificial conditions may for example be street lighting illumination, traffic elements or road reflections.

Such an embodiment is advantageous, as mimicking the dynamics of outdoor conditions may induce the perception of the at least one animal moving through the outdoor domain, even though the at least one animal may be within a stationary first space. Hence, the animals may advantageously be pre-conditioned for the intended move to the second space, which may be a second space in motion, with the use of illumination mimicking the dynamic stimuli that the animals may experience during said motion, e.g. through an outdoor domain. For example, referring back to the example of an animal transport vehicle, an animal transport vehicle may have a cargo space with apertures to the outdoor (e.g. caged, such as a pig transport vehicle). This all mitigates (or: reduces) the stress of the at least one animal, because the at least one animal could already get accustomed to the motion, and possible associated outdoor stimuli, by inducing the perception of motion with illumination.

The environmental characteristic may also be a physical state of a respective space. In an embodiment, the environmental characteristic may be a temperature of a respective space; wherein the temperature of the first space is a first temperature, wherein the temperature of the second space is a second temperature, wherein the second temperature is higher than the first temperature, and wherein illuminating the first space according to the determined first light setting and/or the second space according to the determined second light setting causes a reduced perceived difference between the temperature of the first space and the temperature of the second space. In a related embodiment, the first light setting may comprise a light color and/or color temperature, wherein said light color comprises a reddish light color, and wherein said color temperature comprises a warm color temperature. In a related embodiment, the second light setting may comprise a light color and/or color temperature, wherein said light color comprises a blueish light color, and wherein said color temperature comprises a cold color temperature. Said warm color temperature may be defined as color temperature below 3500 Kelvin, while said cold color temperature may be defined as color temperature above 4500 Kelvin.

Hence, such embodiments are advantageous, because the illumination at the first space with the determined first light setting (e.g. reddish light at lower color temperature) renders a perception at the at least one animal of a warmer temperature, so as to pre-condition the at least one animal for the intended move to the second space having physically the higher temperature. And, because the illumination at the second space with the determined second light setting (e.g. blueish light at higher color temperature) renders a perception at the at least one animal of a colder temperature, so as to mitigate the (heat) stress of the at least one animal moving to the second space having a physically higher temperature but perceiving it as not as high.

It is further an object of the invention to provide an improved lighting arrangement, which at least alleviates the problems and disadvantages mentioned above. Therefore, the invention provides a lighting arrangement for illuminating a first space and a second space, and for mitigating stress of at least one animal intended to move from the first space to the second space, wherein the lighting arrangement comprises: the lighting system controller according to any one of the above described embodiments; a lighting system comprising at least one first light source arranged for illuminating the first space according to the invention and/or at least one second light source arranged for illuminating the second space according to the invention; wherein the lighting system controller according to the invention is configured to control the at least one first light source and/or the at least one second light source of the lighting system. Thereby, advantages and/or embodiments applying to the lighting system controller according to the invention may mutatis mutandis apply to said lighting arrangement according to the invention.

In embodiments, said lighting system controller may be in wired communication with the lighting system comprising the at least one first light source and/or the at least one second light source. Alternatively, said lighting system controller may be in wireless communication with the lighting system comprising the at least one first light source and/or the at least one second light source. For example, said first light source and/or said second light source may be wirelessly connected to the lighting system controller, via a wireless modality such as e.g. Wi-Fi, Bluetooth, ZigBee, Lo-Ra, RF, IR, VLC, Li-Fi, etc. The lighting system controller may for example be a bridge device.

In alternative examples, the lighting system controller may be part of a master light source of the at least one first light source. Hence, the lighting system controller embodied in the master light source may control the light sources of the at least one first light source and/or the at least one second light source. Yet alternatively, the lighting system controller may alternatively be a remote control device, which obtains the first input and the second input according to the invention, and determines the difference feature and the first light setting and/or the second light setting locally, or performs said determining steps at a connected remote backend location, so as to control the at least one first light source and/or the at least one second light source. Different lighting control architectures may thus be envisioned.

It is further an object of the invention to provide an improved method, which at least alleviates the problems and disadvantages mentioned above. Therefore, the invention provides a method of mitigating stress of at least one animal intended to move from a first space to a second space, wherein said stress is caused by a perceived difference, as perceived by the at least one animal, between the first space and the second space; wherein the method comprises a lighting system controller: obtaining a first input indicative of an environmental characteristic of the first space; obtaining a second input indicative of an environmental characteristic of the second space; determining a difference feature between the environmental characteristic of the first space and the environmental characteristic of the second space; determining a first light setting for illuminating the first space and/or a second light setting for illuminating the second space based on said difference feature, wherein the first light setting and/or said second light setting is configured to reduce said perceived difference between the environmental characteristic of the first space and the environmental characteristic of the second space; controlling at least one first light source to illuminate the first space according to the determined first light setting during a first time period, and/or controlling at least one second light source to illuminate the second space according to the determined second light setting during a second time period; wherein the environmental characteristic is a geometric dimension of a respective space, and/or wherein the environmental characteristic is a dynamic state of a respective space. Thereby, advantages and/or embodiments applying to the lighting system controller according to the invention may mutatis mutandis apply to said method according to the invention.

The invention further relates to a computer program product. Hence, the invention provides a computer program product for a computing device, the computer program product comprising computer program code to perform the method(s) according to the invention when the computer program product is run on a processing unit of the computing device. Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

BRIEF DESCRIPTION OF THE DRAWINGS

The invention will now be further elucidated by means of the schematic non-limiting drawings.

DETAILED DESCRIPTION OF THE EMBODIMENTS

As mentioned, a clear need exists to improve animal welfare in animal farming, by reducing stress in animals caused by disruptions in their lifecycle, especially disruptions related to relocation. It is therefore an object of the present invention to reduce stress in animals by making disruptions in their lifecycle perceived as less impactful with the use of illumination. The present invention in particular addresses disruptions caused by relocating at least one animal from a first space, to which the at least one animal is accustomed, to a different second space. Thereby, the invention leverages the insight that illumination may be used to optically reduce the perceived difference, as perceived by the at least one animal, between the first space and second space.

Figure 1:
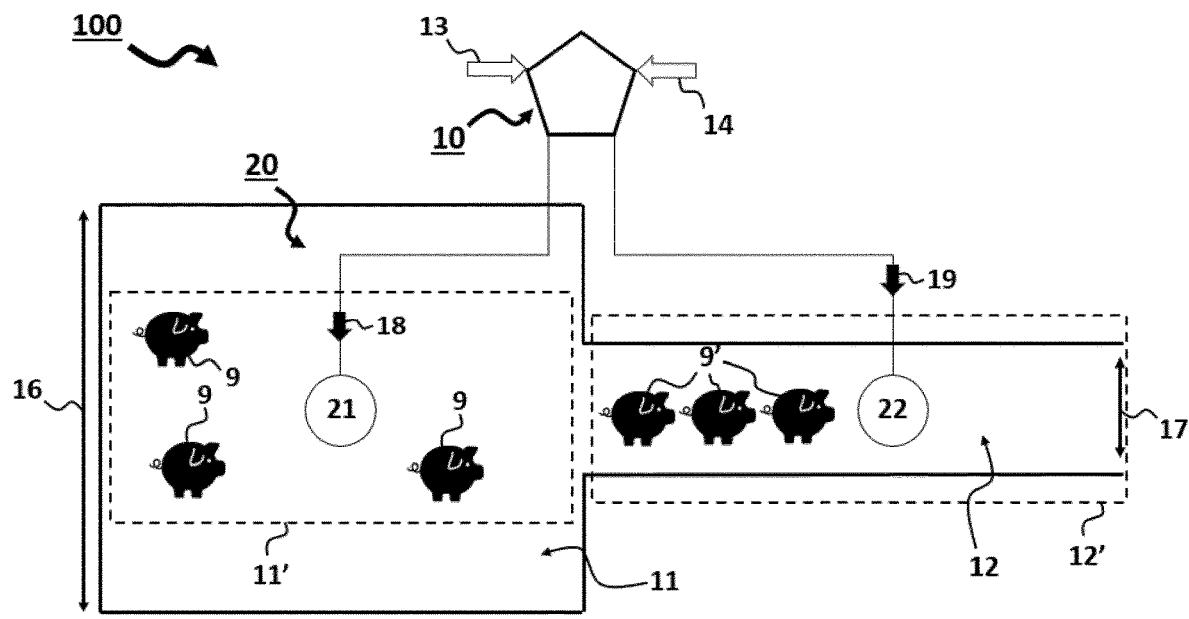
FIG. 1 depicts schematically an embodiment of a lighting arrangement according to the invention comprising a lighting system controller according to the invention.

FIG. 1 depicts schematically, by non-limiting example, a lighting arrangement 100 according to the invention comprising a lighting system controller 10 according to the invention. The lighting arrangement 100 further comprises a lighting system 20. The lighting system 20 comprises at least one first light source 21 and at least one second light source 22.

The at least one first light source 21 is a luminaire configured to illuminate a first space 11. Here, the first space 11 is an animal enclosure for holding at least one animal 9. The at least one second light source 22 is a luminaire configured to illuminate a second space 12. Here, the second space 12 is a corridor for relocating the at least one animal 9 from the first space 11 to another space. Hence, the at least one animal 9 is intended to move from the first space 11 to the second space 12. The second space 12 is adjacent to the first space 11, though this is not necessary for the present invention. Here, the at least one animal 9 is a group of pigs.

Alternatively, said at least one animal may be at least one other animal as mentioned in the application, such as chicken, poultry, cattle, etc. Said luminaire may be a projector, spotlight, a wall washer, a flood light, a pivotable light source, a cove light, an LED strip, an LED panel, etc. The at least one first light source may alternatively be a set of lighting devices for illuminating at least one surface in said first space. The at least one second light source may alternatively be a set of lighting devices for illuminating at least one surface in said second space. The first space and/or the second space may alternatively be one of: a room, a chamber, a stable, a farm, a container, a cargo space, a pen, a corridor, a funnel, a box, a conveyor belt, a vehicle, a pit, a housing, and a basin.

Referring to FIG. 1, the lighting system controller 10 is configured to control the lighting system 20. More specifically, the lighting system controller 10 is configured to control, in operation, the at least one first light source 21 and/or the at least one second light source 22. Here, the lighting system controller 10 is in wired communication with the first light source 21 and/or the second light source 22. However, alternatively, said lighting system controller may be in wireless communication with the first light source and/or the second light source. Hence, said at least one first light source and said at least one second light source may be smart connected lighting comprising a wireless transceiver to receive control commands from said lighting system controller. Said communication may be via e.g. Wi-Fi, Bluetooth, ZigBee, Lo-Ra, RF, IR, VLC, Li-Fi, etc.

Referring to FIG. 1, the lighting system controller 10 according to the invention is arranged to mitigate stress of the at least one animal 9 when the at least one animal 9 is moved from the first space 11 to the second space 12. The at least one animal 9 moved to the second space 12 is referred to using reference 9'. The stress is thereby caused by a perceived difference, as perceived by the at least one animal 9, between the first space 11 and the second space 12. Namely, as depicted here, the group of pigs 9 will experience stress when moved from their accustomed animal enclosure 11 to the narrower corridor 12.

The lighting system controller 10 according to the invention is therefore configured to obtain a first input 13 and a second input 14. The first input 13 is indicative of an environmental characteristic 16 of the first space 11. The second input 14 is indicative of an environmental characteristic 17 of the second space 12.

Namely, in the present embodiment, the environmental characteristic is a geometric dimension of a respective space. More specifically, in the present embodiment, the environmental characteristic is a width of the respective space.

Said environmental characteristic may be different in alternative embodiments, for example another geometric dimension such as a height, a volume, a surface area, a layout, a slope, a shape, or a configuration of the respective space. Yet alternatively, said environmental characteristic may be for example a physical state, or a dynamic state of the respective space. These are explained, as non-limiting examples, in other embodiments below.

Still referring to FIG. 1, the width 17 of the second space 12 (i.e. the corridor) is smaller than the width 16 of the first space 11. Hence, the geometric dimension (i.e. width) of the second space 12 is smaller than the corresponding geometric dimension (i.e. width) of the first space 11. The lighting system controller 10 obtains said first input 13 and said second input 14. Here, the first input 13 and said second input 14 are obtained from a server.

Alternatively, the first input 13 and/or the second input 14 may be retrieved from a database, accessible to the lighting system controller. Alternatively, the first input and/or the second input may be stored in a memory of the lighting system controller, and the lighting system controller may obtain said first input and/or said second input from said memory. Alternatively, the first input and/or the second input may be sent to the lighting system controller by a third device, such as a user device, a building management system, or a bridge device. Various data flow architectures may be envisioned.

Optionally, the lighting system controller may also receive an input from said server, or another external device, which input is indicative of a time of said intended move of the at least one animal, wherein the lighting system controller is configured to determine a first time period prior to said intended move and/or a second time period after said intended move based on said input indicative of the time of said intended move of the at least one animal.

Still referring to FIG. 1, as mentioned, the lighting system controller 10 obtains a first input 13 indicative of the environmental characteristic 16 of the first space 11, i.e. the width of the first space 11. The lighting system controller 10 receives a second input 14 indicative of the environmental characteristic 17 of the second space 12, i.e. the width of the second space 12.

The lighting system controller 10 then determines a difference feature between the environmental characteristic 16 of the first space 11 and the environmental characteristic 17 of the second space 12. The lighting system controller may thereby compare the first environmental characteristic 16 to the second environmental characteristic 17 and determine said difference feature based on said comparison. Hence, the lighting system controller 10 determines a difference feature 15 between the width 16 of the first space 11 and the width 17 of the second space 12. Here, said difference feature is a relative difference feature that the width of the second space 12 is smaller than the width of the first space 11.

In alternative embodiments, said difference feature may be a difference feature in that the width of the second space is a factor F smaller than the width of the first space. Yet in further alternative embodiments, said difference feature may be an absolute difference feature, such as for example that the width of the second space is a value X meters smaller than the width of the first space.

Still referring to FIG. 1, the lighting system controller 10 then determines a first light setting 18 and/or a second light setting 19 based on the difference feature. As mentioned before, the invention leverages the insight that illumination may be used to optically reduce the perceived difference, as perceived by the at least one animal 9, between the first space 11 and second space 12.

Therefore, the first light setting 18 is arranged for illuminating the first space 11 to reduce said perceived difference between the environmental characteristic 16 of the first space 11 and the environmental characteristic 17 of the second space 12. The second light setting 19 is arranged for illuminating the second space 12 to reduce said perceived difference between the environmental characteristic 16 of the first space 11 and the environmental characteristic 17 of the second space 12.

Hence, the first light setting 18 is configured to cause the first space 11 to be perceived optically, by the at least one animal 9, as having a smaller width. Hence, the second light setting 19 is configured to cause the second space 12 to be perceived optically, by the at least one animal 9, as having a larger width.

Therefore, still referring to FIG. 1, the lighting system controller 10 controls the at least one first light source 21 to illuminate the first space 11 according to the determined first light setting 18 during a first time period. The lighting system controller 10 may also control, additionally or alternatively, the at least one second light source 22 to illuminate the second space 12 according to the determined second light setting 19 during a second time period.

Said first time period is at least prior to the move of the at least one animal 9 from the first space 11 to the second space 12. Said second time period is at least after the move of the at least one animal 9 from the first space 11 to the second space 12.

Here, illuminating the second space 12 with the determined second light setting 19 may comprise various illumination options, which illumination options may optically enlarge the width of the second space 12 and thereby reduce the perceived difference between the width 16 of the first space 11 and the width 17 of the second space 12. These illumination options are depicted, by non-limiting example, in FIG. 2A-2D. Similar options may be envisioned for reducing a difference in length, height, volume, etc.

Figure 2D:
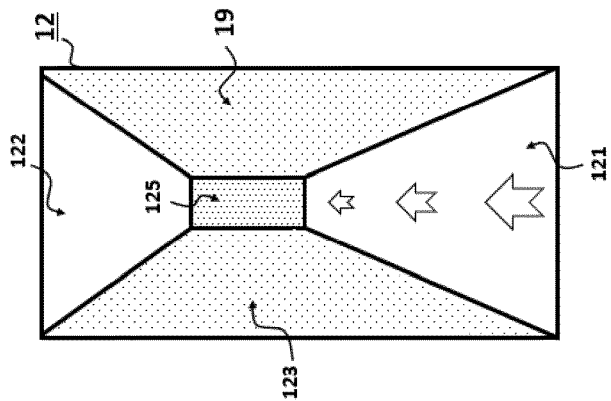
FIGS. 2A-2D depict schematically different light settings according to the invention.
Figure 2C:
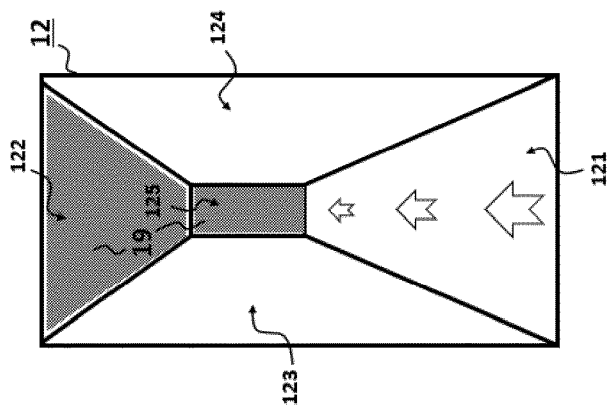
Figure 2B:
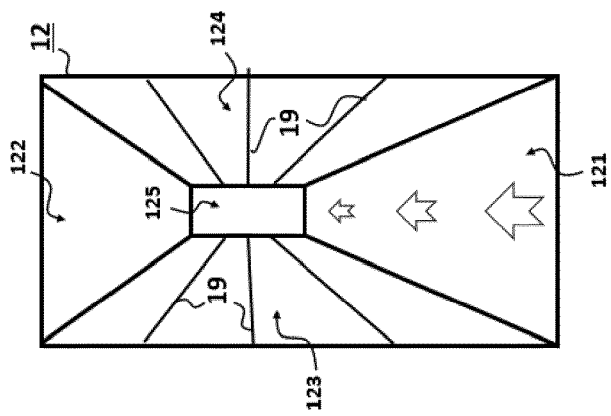
Figure 2A:
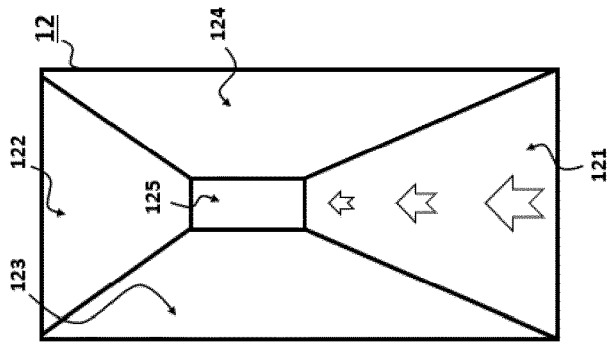

Referring to FIGS. 2A-2D, the second space 12 (i.e. the corridor) is schematically depicted, by non-limiting example, in perspective view. The second space 12 is delimited by a set of surfaces. Namely, the second space 12 comprises a floor surface 121, a ceiling surface 122, a left wall 123, a right wall 124, and a front wall 125. FIG. 2A depicts the second space 12 not being illuminated with the second light setting 19, i.e. not during the second time period. Hence, FIG. 2A may serve as a reference for the various illumination options mentioned below.

Referring to FIG. 2B, the second light setting 19 comprises a projection of at least one horizontal line pattern. More specifically, the second light setting 19 comprises a projection of a plurality of horizontal lines onto the right wall 124 and the left wall 123 of the second space 12. Such horizontal lines allow the at least one animal 9' to perceive said corridor as broader in width, relative to the reference situation without said horizontal lines, and thereby to perceive less difference between the first space 11 and the second space 12.

Alternatively, said second light setting may for example be an increase of light intensity of unlit parts of the second space, or for example an increase of light intensity at peripheral regions of the second space. Such illumination may also allow the at least one animal to perceive said corridor as broader in width, relative to the reference situation depicted in FIG. 2A.

Referring to FIG. 2C, the second light setting 19 comprises illuminating a first subset of surfaces of the set of surfaces delimiting the second space 12 with a first color light. More specifically, the second light setting 19 comprises illuminating the ceiling surface 122 and the front wall 125 with a first color light. The first color light is a red color. The red color may be darker than the other surfaces of the set of surfaces. Illuminating the second space 12 according to this determined second light setting 19 renders a perception of a larger length and larger width of the second space 12 and causes a reduced perceived difference between the width 16 of the first space 11 and the width 17 of the second space 12.

Optionally, the second light setting may comprise illuminating a second subset of surfaces of the set of surfaces delimiting the second space, namely the remaining surfaces (left wall, right wall, floor surface), with a second light color that is being different from the first light color, wherein the first color is darker than the second color.

Referring to FIG. 2D, the second light setting 19 comprises illuminating a first subset of surfaces of the set of surfaces delimiting the second space 12 with a first color light. More specifically, the second light setting 19 comprises illuminating the vertical surfaces, namely the left wall, the right wall, and the front wall with the first color light. The first color light may be green. Illuminating the second space 12 according to this determined second light setting 19 renders a perception of a larger width of the second space 12 and causes a reduced perceived difference between the width 16 of the first space 11 and the width 17 of the second space 12.

Such illumination options are advantageous, as the illuminating of the second space 12 with said determined second light setting 19 reduces the perceived difference between the respective geometric dimension (i.e. width in the present embodiment) of the first space 11 and the second space 12, thereby mitigating (or: reducing) the stress of the at least one animal 9', that would be caused when moving the animal 9 from the first space 11 (to which the animal 9 is accustomed to) to the (new and different) second space 12.

Moreover, as partly mentioned, to mitigate the stress caused by moving the at least one animal 9 from a first space 11 to a second space 12, wherein the second space 12 has a smaller width relative to the first space 11, the at least one animal 9 may be pre-conditioned in the broader-width first space 11 to the upcoming smaller-width second space 12 by illuminating the first space 11 according to a determined first light setting 18. In other words, the at least one animal 9 in a first space 11 may be prepared during a first time period for an intended move to a different second space 12. Said preparing may comprise getting the at least one animal 9 accustomed to the different environmental characteristic (i.e. width) of the second space 12 with the use of illumination.

Here, illuminating the first space 11 with the determined first light setting 18 may comprise various illumination options, which illumination options may optically reduce the width of the first space 11 and thereby reduce the perceived difference between the width 16 of the first space 11 and the width 17 of the second space 12. These illumination options are depicted, by non-limiting example, in FIGS. 3A-3D. Similar options may be envisioned for reducing a difference in length, height, volume, etc.

Figure 3B:
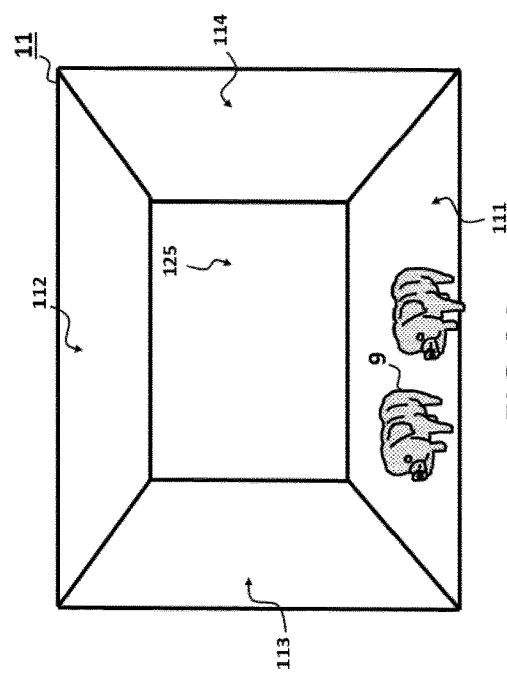
FIGS. 3A-3D depict schematically different light settings according to the invention.
Figure 3D:
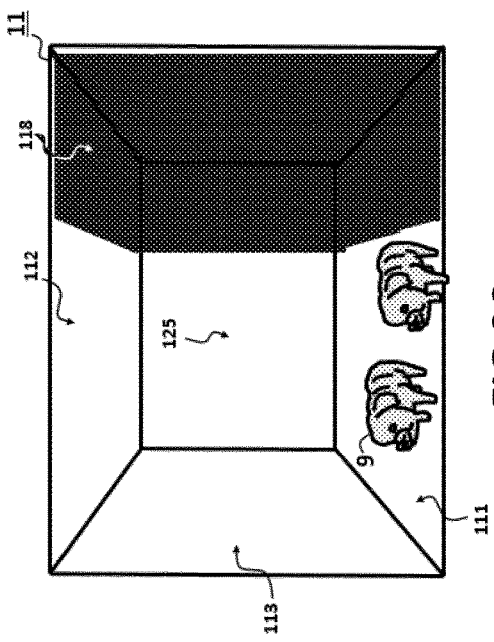
Figure 3A:
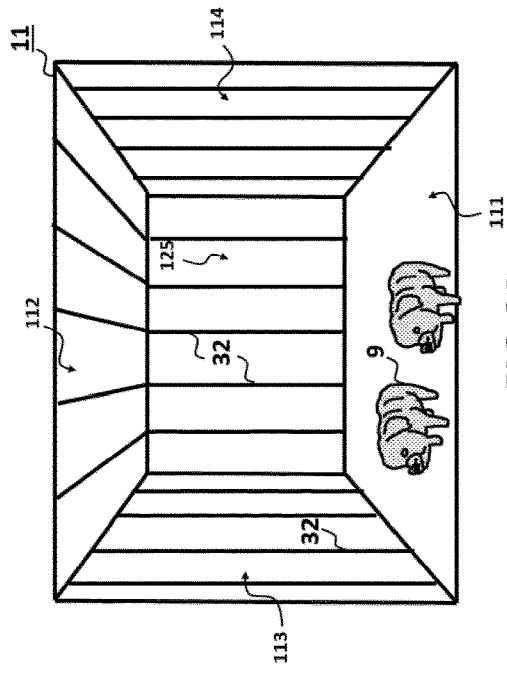

Referring to FIGS. 3A-3D, the first space 11 (i.e. the animal enclosure holding the group of pigs 9) is schematically depicted, by non-limiting example, in perspective view. The first space 11 is delimited by a set of surfaces. Namely, the first space 11 comprises a floor surface 111, a ceiling surface 112, a left wall 113, a right wall 114, and a front wall 115. FIG. 3A depicts the first space 11 not being illuminated with the first light setting 18, i.e. not during the first time period. Hence, FIG. 3A may serve as a reference for the various illumination options mentioned below.

Referring to FIG. 3B, the first light setting 19 comprises a projection of at least one vertical line pattern 32. More specifically, the first light setting 18 comprises a projection of a plurality of vertical lines onto the right wall 114, the front wall 125, the left wall 113 of the second space 12. Moreover, optionally, in addition, the ceiling surface 112 may comprise horizontal lines, which are projected continuing the vertical lines projected onto the front wall 125. Other configurations may be similarly envisioned, in alternative examples, wherein only one or two of said surfaces are provided with said first light setting. Such vertical lines 32 allow the at least one animal 9 to perceive said first space 11 (i.e. the animal enclosure to which the at least one animal are accustomed to) to be perceived as optically smaller in width, relative to the reference situation without said vertical lines, and thereby to pre-condition the at least one animal 9 to perceive less difference between the first space 11 and the second space 12 to which the at least one animal will be moved towards.

Figure 3C:
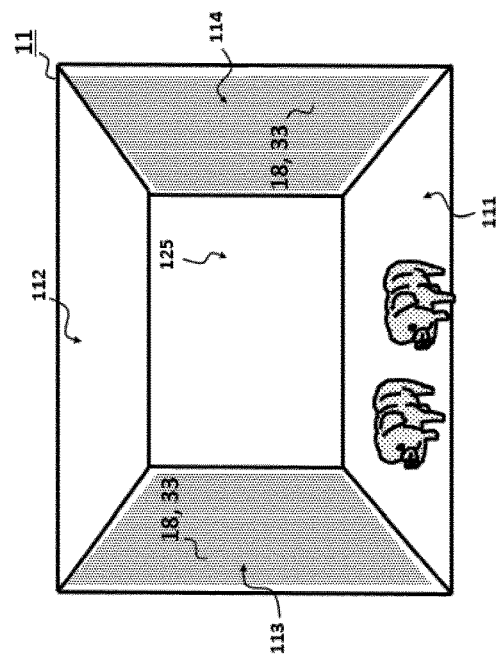

Referring to FIG. 3C, the first light setting 19 comprises a decrease of light intensity of a first part 118 of the first space 11. Hence, the first part 118 is kept dark, in other words not illuminated, while a second part 119 is illuminated with a threshold intensity. Alternatively, the first light setting may comprise a decrease in light intensity at peripheral regions of the first space.

Referring to FIG. 3D, the first light setting 19 comprises illuminating a first subset of surfaces of the set of surfaces delimiting the first space 11 with a first color light 33. More specifically, the first light setting 18 comprises illuminating the left wall 113 opposite to said right wall 114 with a first color light 33. First color light 33 is a red color. The red color may alternatively be blue or green. The first color light is different in color, and darker compared to the remaining surfaces of the first space 11, such as the ceiling surface 112 and front surface 125, which may be of white color or optionally illuminated as a second subset of surfaces with a brighter second color light, for example white. Illuminating the first space 11 according to this determined first light setting 18 renders a perception of a smaller width of the first space 11 and causes a reduced perceived difference between the width 16 of the first space 11 and the width 17 of the second space 12. Such an illumination option is advantageous, as highlighting certain walls 113, 114 in the first space 11 with a first light color 33, said first space 11 may be perceived as more confined, and thereby having a smaller width.

Yet even further, in an embodiment, not depicted, the first light setting may comprise a projection of a first grid pattern in the first space, wherein the second light setting comprises a projection of a second grid pattern in the second space, wherein a grid size of the second grid pattern is larger than a grid size of the first grid pattern. In other alternatives, the first light setting may comprise a projection of gradually narrowing concentric circles during the first time period, or a projection of a gradually narrowing trellis pattern during the first time period.

All in all, because the determined first light setting 18 and/or the determined second light setting 19 is configured to reduce the perceived difference, as perceived by the at least one animal 9, between the environmental characteristic 16 (i.e. width) of the first space 11 and the environmental characteristic 17 (i.e. width) of the second space 12, the illumination of the first space 11 and/or the illumination of the second space 12 would result in the at least one animal 9 experiencing less stress, since the perceived difference between the first space 11 and the second space 12 (and their respectively perceived environmental characteristics) is less, and/or since the animal is pre-conditioned to the environmental characteristic of the second space 12 and thereby perceives the difference as less. This effect, i.e. how the at least one animal 9 perceives the first space 11 and/or the second space 12 when illuminated as mentioned above, is schematically depicted in FIG. 1 as the dotted lines 11' and 12'.

Hence, animal welfare is improved, as the at least one animal 9 experiences less stress, due to the lighting system controller 10 controlling the illumination in the first space 11 and/or the second space 12 based on the determined difference feature and reduces the perceived differences between the first space 11 and the second space 12.

Figure 4:
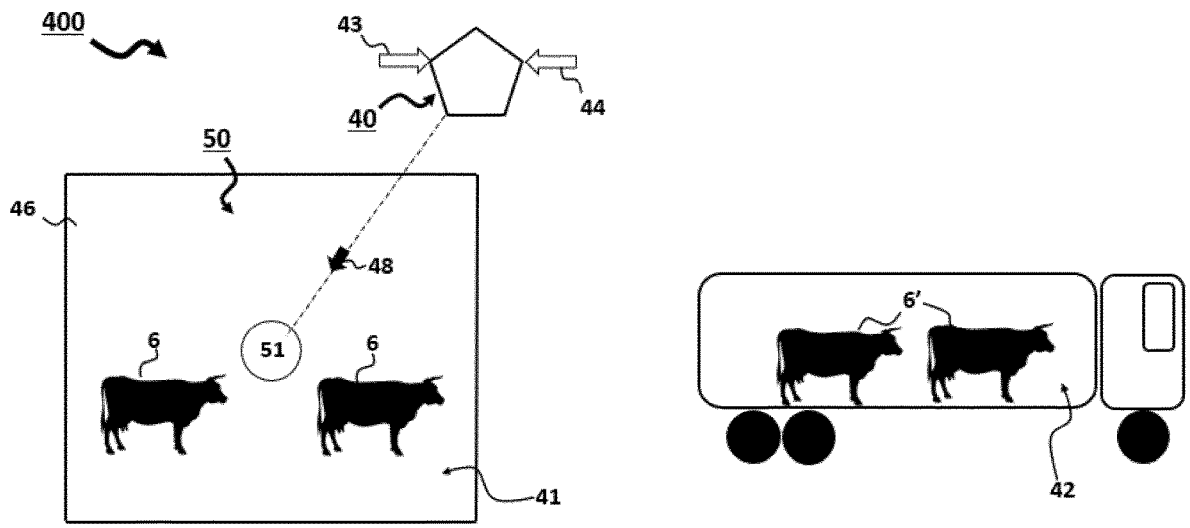
FIG. 4 depicts schematically an embodiment of a lighting arrangement according to the invention comprising a lighting system controller according to the invention.

FIG. 4 depicts schematically, by non-limiting example, a lighting arrangement 400 according to the invention. The lighting arrangement 400 comprises a lighting system controller 40 according to the invention. The lighting arrangement further comprises a lighting system 50. The lighting system 50 comprises a first light source 51 arranged at a first space 41. The first light source 51 is wirelessly connected to the lighting system controller 40, via e.g. bluetooth or ZigBee. Alternative wired or wireless communication modalities may similarly be envisioned. The first space 41 is a stable. The first space accommodates at least one animal 6. The at least one animal 6 are a group of cows. Alternatively, said at least one animal may be any other animal mentioned in this application.

The at least one animal 6 is intended to be moved from the first space 41 to a second space 42. The second space 42 is a cargo space of a transport vehicle, with which said at least one animal 6 (i.e. group of cows) is intended to be transported. This transport may render stress on the cows, because the cows are moved from a static first space 41 (i.e. their stable) to a moving second space 42 (i.e. the cargo space of the transport vehicle). To mitigate the stress caused by relocating the at least one animal 6 from a static first space 41 to said moving second space 42 (i.e. e.g. the cargo space of a transport vehicle), the at least one animal 6 may be pre-conditioned in the static first space 41 to the upcoming moving second space 42 by illuminating the first space 41 according to a determined first light setting 48.

To be more specific, referring to FIG. 4, the lighting system controller 40 is arranged for mitigating the stress of the at least one animal 6 intended to move from the first space 41 to the second space 42. As mentioned, the stress is caused by a perceived difference, as perceived by the at least one animal 6, between the first space 41 and the second space 42.

The lighting system controller 40 is configured to obtain a first input 43 indicative of an environmental characteristic 46 of the first space 41. The lighting system controller 40 is also configured to obtain a second input 44 indicative of an environmental characteristic 47 of the second space 42. Here, the environmental characteristic is a dynamic state. The dynamic state, as defined within this application, may relate to a respective space being stationary (or: static) or being in motion.

Namely, the environmental characteristic 46 of the first space 41 is the first space 41 being static, and the environmental characteristic of the second space 42 is the second space 42 being in motion. Thereby, being in motion may refer to being in motion at least partly during a certain time period. For example, the cargo space of an animal transport vehicle may be considered in motion, even though the vehicle may stop occasionally for traffic lights.

Here, the first input 43 and the second input 44 are prestored in a memory (not depicted) of the lighting system controller 40, and retrieved by the lighting system controller 40 from said memory before or during a first moment in time. Said memory may for example store relocation schedules for said group of cows 6. Said first moment in time is before the move of the at least one animal 6 to the second location 42. The lighting system controller 40 thus has knowledge about the cargo space of the transport vehicle due to the second input 44. Alternatively, the first input may be received or retrieved from another device. For example, the second input is received from a third device. Said third device may for example be a portable personal device of the driver of the transport vehicle, or an external database. Alternatively, the second input may be retrieved from another device, such as a central server or scheduling system.

Still referring to FIG. 4, the lighting system controller 40 determines a difference feature between the environmental characteristic 46 of the first space 41 and the environmental characteristic 47 of the second space 42. Here, said difference feature is the notion that the first space 41 is static and the second space is in motion 42. Alternatively, in embodiments, said difference feature may indicate an absolute difference such as a velocity value of the second space 42 relative to the first space.

The lighting system controller 40 then determines a first light setting 48 for illuminating the first space 41 based on said difference feature, so as to reduce the perceived difference between the first space 41 being stationary and the second space 42 being in motion. Here, the first light setting 48 comprises a dynamic light scene for illuminating the first space 41. Here, the dynamic light scene comprises a light pattern moving in a horizontal direction relative to gravity. Alternatively, in case said differentiating feature may be a velocity value, the rate of dynamics may also be determined based on said velocity value. Such embodiments are advantageous, as a light pattern moving in a horizontal direction relative to gravity may induce the perception of motion to the at least one animal, even though the at least one animal may be within a stationary first space.

Alternatively, the dynamic light scene may render wave patterns of light that move in a horizontal direction over standing walls of the stable 41. Other dynamic patterns may be envisioned similarly. Yet alternatively, said dynamic light scene may comprise a light scene mimicking the dynamics of outdoor conditions. Said outdoor conditions may be outdoor natural conditions, or outdoor artificial conditions. Said outdoor natural conditions may for example be shades or moonlight. Said outdoor artificial conditions may for example be street lighting illumination, traffic elements or road reflections.

Still referring to FIG. 4, the lighting system controller 40 controls the first light source 41 to illuminate the first space 41 according to said determined first light setting 48 during a first time period. The first time period is before the intended move of the at least one animal 6 from the first space 41 to the second space 42, i.e. the transport vehicle. The lighting system controller 40 may optionally determine said first time period based on obtaining a schedule, such as a relocation schedule for the at least one animal 6. Said schedule may for example be stored in said memory (not depicted) or retrieved from another device, e.g. from the farmer of the animals.

All in all, illuminating the first space 41 according to the determined first light setting 48 causes a reduced perceived difference between the first space being stationary and the second space being in motion, since the at least one animal is being pre-conditioned to said motion with the illumination according to the determined first light setting 48. Hence, the animals 6 may advantageously be pre-conditioned for the intended move to the second space 42, which is a second space 42 in motion. This mitigates (or: reduces) the stress of the at least one animal 6, because the at least one animal 6 could already get accustomed to the motion by inducing the perception of motion with illumination (in their accustomed and trusted first space 41).

Figure 5:
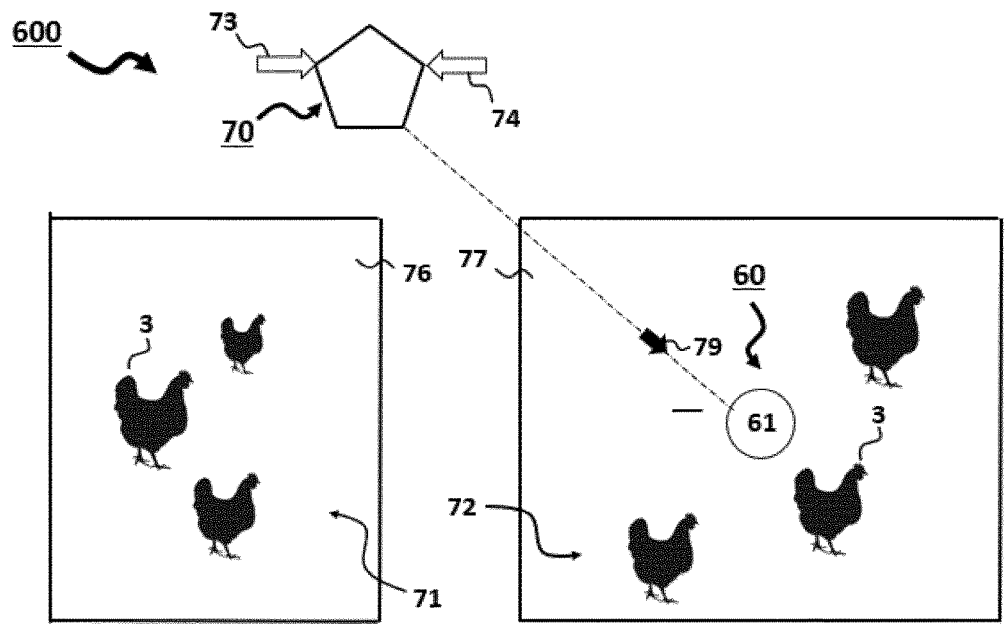
FIG. 5 depicts schematically an embodiment of a lighting arrangement according to the invention comprising a lighting system controller according to the invention.

FIG. 5 depicts schematically, by non-limiting example, a lighting arrangement 600 according to the invention. The lighting arrangement 600 comprises a lighting system controller 70 according to the invention. The lighting arrangement further comprises a lighting system 60. The lighting system 60 comprises a second light source 61 arranged at a second space 72. The second space 72 is a chicken processing zone 72. The chicken processing zone 72 is adjacent to a first area 71. The first area 71 is a chicken stable. The chicken stable 71 holds a flock of chicken 3. This flock of chicken 3 is intended to be moved from the chicken stable 71 to the chicken processing zone 72. Hence, the at least one animal according to the present invention is a flock of chicken in this particular non-limiting embodiment, but may alternatively be any other animal mentioned in this application.

This move may render stress to the flock of chicken, because such a relocation may be considered a disruption in their lifecycle due to sudden changes in the environment and physical conditions. For example, in the present example, the temperature of the chicken processing zone 72 may be higher than the temperature of the chicken stable 71, to which temperature the flock of chicken 3 are accustomed, and wherein said relocation may render heat stress upon arriving at the chicken processing zone 72.

To mitigate the stress caused by relocating the flock of chicken 3 from the chicken stable 71 to the chicken processing zone 72, the flock of chicken may be illuminated in the second space 72 according to a determined second light setting 79 such that the second space 72 appears substantially colder to the flock of chicken 3.

Namely, still referring to FIG. 4, the lighting system controller 70 is arranged to mitigate the heat stress of the flock of chicken 3 intended to move from the chicken stable 71 to the chicken processing zone 72, i.e. from the first space 71 to the second space 72. As mentioned, the heat stress is caused by a perceived difference in temperature, as perceived by the flock of chicken 3, between the chicken stable 71 and the warmer chicken processing zone 72.

The lighting system controller 70 is configured to obtain a first input 73 indicative of an environmental characteristic of the first space 71; and configured to obtain a second input 74 indicative of an environmental characteristic of the second space 72. The environmental characteristic is a physical state of the respective space, more specifically the temperature of the respective space.

Hence, the lighting system controller 70 obtains the first input 73 and the second input 74, and thereby respectively the temperature 76 of the first space 71 and the temperature 77 of the second space 72. As mentioned, the temperature 77 of the second space 72 (i.e. the chicken processing zone) is higher than the temperature 76 of the first space 71 (i.e. the chicken stable). Said first input 73 and said second input 74 may for example be received or retrieved from sensor devices associated with said first space and said second space.

Alternatively, said first input and said second input may be received or retrieved from a database or central server, such as a building management server, or a user device. Alternatively, said first input may be a default or fixed value of temperature of the first space. This default or fixed value may e.g. be prestored on a memory accessible by the lighting system controller, e.g. a local memory in the lighting system controller itself.

Still referring to FIG. 5, the lighting system controller 70 determines a difference feature between the temperature 76 of the first space 71 and the temperature of the second space 72. Said difference feature is a difference value in temperature. Alternatively, said difference feature may be the notion that the second space is warmer than the first space. The lighting system controller 70 then determines a second light setting 79 for illuminating the second space 72 based on said difference feature to reduce the perceived difference between the temperature 76 of the first space 71 and the temperature of the second space 72.

Here, said second light setting 79 comprises a blue light and optionally with a higher (cold) color temperature. The lighting system controller 70 is further configured to control the second light source 62 according to the determined second light setting 79. Said control may be during a second time period. The second time period being after the move of the flock of chicken 3 to the second space 72, i.e. the chicken processing zone 72.

Since illumination at the second space 72 with the determined second light setting 79 (e.g. blueish light at higher color temperature) renders a perception at the flock of chicken 3 of a colder temperature, so as to mitigate the (heat) stress of the flock of chicken 3 moving to the second space 72 having a physically higher temperature but perceiving it as less higher. Hence, the lighting system controller 70 according to the present invention advantageously controls the lighting system 60 and thereby reduces heat stress of the at least one animal 3.

In an additional or alternative embodiment, not depicted, the lighting system may comprise a first light source arranged at the first space, wherein the lighting system controller is configured to determine a first light setting based on said difference feature to illuminate the first space to reduce the perceived difference between the temperature of the first space and the temperature of the second space. The lighting system controller is further configured to control said first light source to illuminate the space with said determined first light setting. Thereby, the determined first light setting is reddish light at higher color temperature, which may pre-condition the flock of chicken for the intended move to the second space having physically the higher temperature. Hence, such embodiments are advantageous, because the illumination at the first space with the determined first light setting (e.g. reddish light at higher color temperature) renders a perception at the at least one animal of a warmer temperature, so as to pre-condition the at least one animal for the intended move to the second space having physically the higher temperature.

Figure 6:
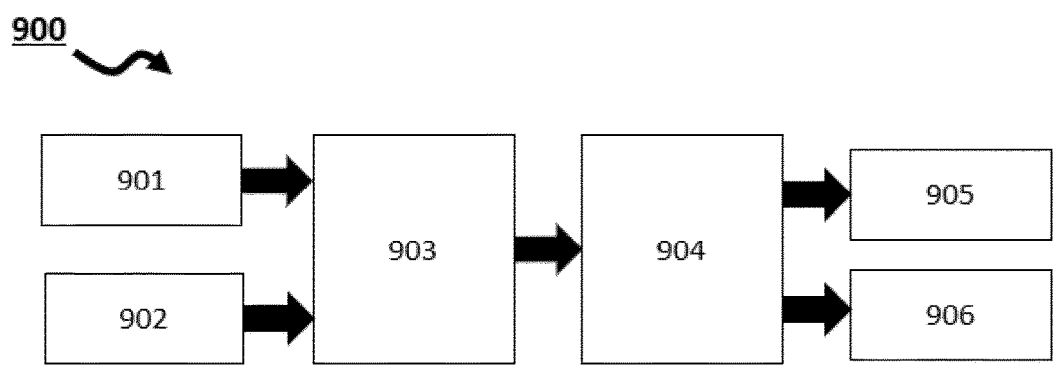
FIG. 6 depicts schematically a method according to the invention.

FIG. 6 depicts schematically, by non-limiting example, a method 900 according to the invention of mitigating stress of at least one animal intended to move from a first space to a second space. The stress is thereby caused by a perceived difference, as perceived by the at least one animal, between the first space and the second space. The method comprises a lighting system controller performing a step 901 of obtaining a first input indicative of an environmental characteristic of the first space; and a step 902 of obtaining a second input indicative of an environmental characteristic of the second space. The method 900 further comprises a step 903 of lighting system controller determining a difference feature between the environmental characteristic of the first space and the environmental characteristic of the second space. The method 900 further comprises a step 904 of lighting system controller determining a first light setting for illuminating the first space and/or a second light setting for illuminating the second space based on said difference feature to reduce said perceived difference between the environmental characteristic of the first space and the environmental characteristic of the second space. The method 900 further comprises a step 905 of lighting system controller controlling at least one first light source to illuminate the first space according to the determined first light setting during a first time period, and/or a step 906 of controlling at least one second light source to illuminate the second space according to the determined second light setting during a second time period.

The invention claimed is:

1. A lighting system controller for mitigating stress of at least one animal intended to move from a first space to a second space, wherein said stress is caused by a perceived difference, as perceived by the at least one animal, between the first space and the second space;
   wherein the lighting system controller is configured to:
      obtain a first input indicative of an environmental characteristic of the first space;
      obtain a second input indicative of an environmental characteristic of the second space;
      determine a difference feature between the environmental characteristic of the first space and the environmental characteristic of the second space;
      determine a first light setting for illuminating the first space and/or a second light setting for illuminating the second space based on said difference feature, wherein the first light setting and/or said second light setting is configured to reduce said perceived difference between the environmental characteristic of the first space and the environmental characteristic of the second space; and
      control at least one first light source to illuminate the first space according to the determined first light setting during a first time period, and/or control at least one second light source to illuminate the second space according to the determined second light setting during a second time period;
   wherein the environmental characteristic is a geometric dimension of a respective space, and
   wherein the environmental characteristic is a dynamic state of a respective space.

2. The lighting system controller according to claim 1,
   wherein the geometric dimension of the second space is smaller than the corresponding geometric dimension of the first space;
   wherein illuminating the first space according to the determined first light setting and/or the second space according to the determined second light setting causes a reduced perceived difference between the geometric dimension of the first space and the geometric dimension of the second space.

3. The lighting system controller according to claim 1, wherein the geometric dimension is a length or a width of the respective space.

4. The lighting system controller according to claim 3, wherein the second time period is after the move of the at least one animal from the first space to the second space;
   wherein the second light setting comprises at least one of:
      (i) a projection of at least one horizontal line pattern,
      (ii) an increase of light intensity of unlit parts of the second space, and
      (iii) an increase of light intensity at peripheral regions of the second space, wherein illuminating the second space according to the determined second light setting renders a perception of a larger length and/or larger width of the second space and causes a reduced perceived difference between the geometric dimension of the first space and the geometric dimension of the second space.

5. The lighting system controller according to claim 3, wherein the lighting system controller is arranged for mitigating said stress by pre-conditioning the at least one animal in the first space to the environmental characteristic of the second space;
   wherein the first time period is prior to the move of the at least one animal from the first space to the second space;
   wherein the first light setting comprises at least one of:
   (i) a projection of at least one vertical line pattern,
   (ii) a decrease of light intensity of lit parts of the first space,
   (iii) a decrease in light intensity at peripheral regions of the first space,
   (iv) an increase in light intensity in non-peripheral regions of the first space,
   (v) a projection of a gradually narrowing concentric circles during the first time period, and
   (vi) a projection of a gradually narrowing trellis pattern during the first time period;
   wherein illuminating the first space according to the determined first light setting renders a perception of a smaller length and/or smaller width of the first space and causes a reduced perceived difference between the geometric dimension of the first space and the geometric dimension of the second space.

6. The lighting system controller according to claim 3, wherein the first light setting comprises a projection of a first grid pattern in the first space, wherein the second light setting comprises a projection of second grid pattern in the second space, wherein a grid size of the second grid pattern is larger than a grid size of the first grid pattern.

7. The lighting system controller according to claim 3, wherein the second space may comprise a set of surfaces delimiting the second space;
   wherein the second light setting may comprise illuminating a first subset of surfaces of the set of surfaces delimiting the second space with a first color light and/or illuminating a second subset of surfaces of the set of surfaces delimiting the second space with a second color light; and
   wherein said first color light is different to said second color light;
   wherein illuminating the second space according to the determined second light setting renders a perception of a larger length or larger width of the second space and causes a reduced perceived difference between the geometric dimension of the first space and the geometric dimension of the second space.

8. The lighting system controller according to claim 1, wherein the first space is an animal enclosure; wherein the second space is a corridor; wherein the geometric dimension is a width of the respective space; wherein the width of the corridor is smaller than the width of the animal enclosure.

9. The lighting system controller according to claim 1, wherein the first space is stationary, wherein the second space is in motion; and
   wherein illuminating the first space according to the determined first light setting and/or the second space according to the determined second light setting causes a reduced perceived difference between the first space being stationary and the second space being in motion.

10. The lighting system controller according to claim 9, wherein the first light setting comprises a dynamic light scene for illuminating the first space.

11. The lighting system controller according to claim 10, wherein said dynamic light scene comprises a light pattern moving in horizontal direction relative to gravity, or a light scene mimicking the dynamics of outdoor natural conditions.

12. A lighting arrangement for illuminating a first space and a second space, and for mitigating stress of at least one animal intended to move from the first space to the second space, wherein the lighting arrangement comprises:
   the lighting system controller according to any one of the preceding claims;
   a lighting system comprising at least one first light source arranged for illuminating the first space and/or at least one second light source arranged for illuminating the second space; and
   wherein the lighting system controller is configured to control the at least one first light source and/or the at least one second light source of the lighting system.

13. A method of mitigating stress of at least one animal intended to move from a first space to a second space, wherein said stress is caused by a perceived difference, as perceived by the at least one animal, between the first space and the second space;
   wherein the method comprises a lighting system controller:
      obtaining a first input indicative of an environmental characteristic of the first space;
      obtaining a second input indicative of an environmental characteristic of the second space;
      determining a difference feature between the environmental characteristic of the first space and the environmental characteristic of the second space;
      determining a first light setting for illuminating the first space and/or a second light setting for illuminating the second space based on said difference feature, wherein the first light setting and/or said second light setting is configured to reduce said perceived difference between the environmental characteristic of the first space and the environmental characteristic of the second space; and
      controlling at least one first light source to illuminate the first space according to the determined first light setting during a first time period, and/or controlling at least one second light source to illuminate the second space according to the determined second light setting during a second time period;
   wherein the environmental characteristic is a geometric dimension of a respective space, and
   wherein the environmental characteristic is a dynamic state of a respective space.

* * * * *